United States Patent [19]
Davidson

[11] Patent Number: 5,699,527
[45] Date of Patent: Dec. 16, 1997

[54] METHOD AND SYSTEM FOR PROCESSING LOAN

[76] Inventor: David Edward Davidson, 44 Whisper Dr., Worcester, Mass. 01609

[21] Appl. No.: 432,096

[22] Filed: May 1, 1995

[51] Int. Cl.$^6$ .................................................... G06F 17/00
[52] U.S. Cl. .................................................... 395/238
[58] Field of Search .................................. 364/408, 401, 364/406, 403; 235/375, 380; 395/235, 238

[56] References Cited

U.S. PATENT DOCUMENTS

| | | | |
|---|---|---|---|
| 4,774,664 | 9/1988 | Campbell et al. | 364/408 |
| 4,831,526 | 5/1989 | Luchs et al. | 364/401 |
| 4,914,587 | 4/1990 | Clouse | 364/408 |
| 4,989,141 | 1/1991 | Lyons et al. | 364/408 |
| 5,189,608 | 2/1993 | Lyons et al. | 364/408 |
| 5,193,057 | 3/1993 | Longfield | 364/408 |
| 5,220,501 | 6/1993 | Lawlor et al. | 364/408 |
| 5,239,462 | 8/1993 | Jones et al. | 364/408 |
| 5,272,623 | 12/1993 | Grubb et al. | 364/401 |
| 5,383,113 | 1/1995 | Kight et al. | 364/401 |

*Primary Examiner*—Kevin J. Teska
*Assistant Examiner*—Stephen J. Walder, Jr.
*Attorney, Agent, or Firm*—Davis and Bujold

[57] ABSTRACT

A loan processing system to aid a potential loan applicant preparing the necessary financial statement, loan application, and business plan to apply for a business loan. The loan applicant merely completes the requested information using a computer and transmits the completed information to the lending institution via modem or by mailing the information stored on disk. The lending institution then reviews the transmitted information, checks for inaccuracies, completeness, etc. and responds accordingly. If the loan applicant, in filing out the loan application, has any questions or, if the lending institution has any questions upon receipt of the information, the loan applicant and lending institution may communicate with one another on-line to respond to the query or via mail, e.g. mail a disk with the necessary questions or requests. The system also includes a "HELP" mechanism to access stored information to aid in the preparation of the loan application.

20 Claims, 7 Drawing Sheets

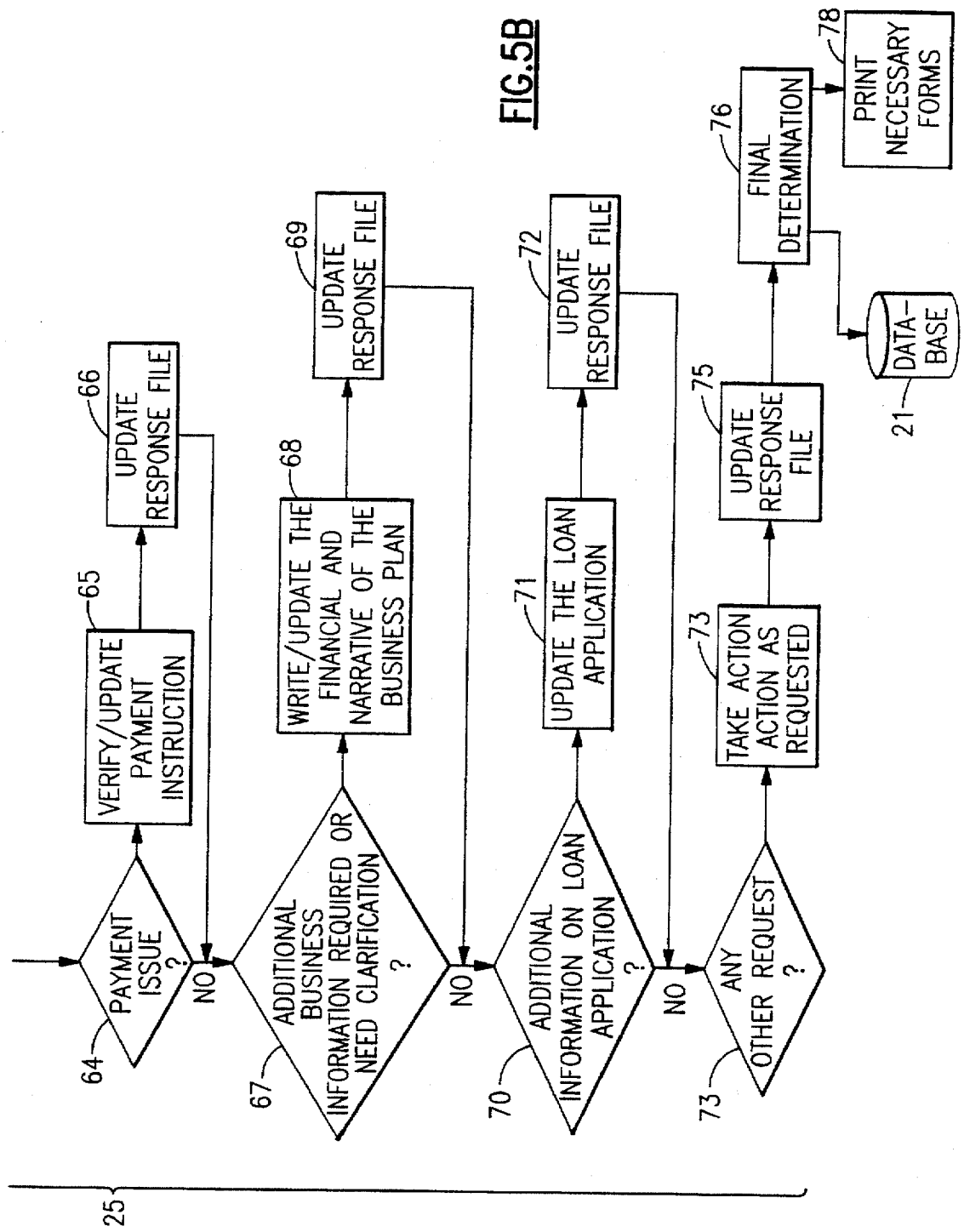

METHOD AND SYSTEM FOR PROCESSING LOAN

This invention relates to a loan processing system for allowing a potential business loan applicant to provide the required loan application information on any computer and transfer a data file or information to the lending institution via mailing a diskette or transmitting such information through a modem or via another electronic transfer mechanism. The received information is then processed at the lending institution in a shorter time period than currently available as such information is in a format which is acceptable and readily usable by the lending institution.

BACKGROUND OF THE INVENTION

To process a commercial loan, a lending institution requires a customer to complete an application, complete any State or Federally required forms, provide financial data such as tax returns, etc., and submit a business plan. This is generally a time consuming process and plagued with attendant likely inaccuracies resulting from miscalculations, vagueness in the instructions, and the generally complicated task of the application process.

To overcome these problems, the present invention is directed to an easy to use loan processing system. Instead of filling in forms, the loan applicant will receive a floppy disk or be provided, via some other electronic transfer medium, with a portable copy of a software program. The software will then be loaded into the loan applicant's PC and the loan applicant will complete the lending institutional's application. In addition, a financial statement and business plan in the exact format required by the lending institution will be completed by the loan applicant with the software. The software also contains up-to-date regulatory forms for use by the loan applicant.

The next step would be to transfer a data file or information, generated by the system, from the loan applicant's PC to the lending institution's master computer via modem link-up with the lending institution's computer or by sending a disk (e.g. by mail) to the lending institution for the lending institution to download into the lending institution's computer. A modem link can provide the ability of the lending institution to send queries to the loan applicant, and vice-versa, regarding the application, financials and/or business plan which the loan applicant could quickly answer via the system or, in greater likelihood, by directly amending the loan application, financials or business plan, thereby speeding the time required to submit all of the necessary application forms in an acceptable format.

Thus far, from the perspective of the lending institution, there has been no paper necessarily generated to store any information in the application, government forms, financials or business plan. One great advantage to the lending institution is that the only necessary paper work will be that required by the law to execute an enforceable contract, to record any lien(s) or to execute a required Federal or State regulatory form(s).

From the perspective of the loan applicant, the loan applicant receives the basis of a business plan and financial statement form from the lending institution at no extra charge and thus can avoid paying expensive fees to a Certified Public Accountant (CPA) and/or lawyer to develop a proper business plan with the necessary financials. The loan applicant is saved endless trips to the lending institution to answer queries that might require amendment to any of the associated forms involved. Moreover, the software can be used by a loan applicant as a general business ledger for general purposes and/or as the financial documentation for a further loan application from the loan applicant's existing lending institution merely by sending updated information to the lending institution.

From the perspective of the lending institution, there is not only a reduction in paper work, but a standardization in the form of all the paperwork used in the loan process. This standardization would, in part, remove the human element from the approval process of a loan. Stated differently, any lending institution employee could open the loan applicant's file, see the progress of the file and take the next step(s) required without having to sit down with the loan officer who initially met with or later communicated with the loan applicant.

The software interaction would also allow the lending institution to maintain current statistics and track who was borrowing, which branches originate which types of loans, the amount of such loans and of any other statistical information derivable from an analysis of the loan files. Such information could be tracked against advertising to determine the impact of advertising and to better discover the target market for any particular loan package. The lending institution could also use the link-up to advertise to or to send pertinent information to existing customers or actual loan applicants with loans.

No known prior art system exists which is directed to the loan processing of commercial loans.

OBJECTS OF THE INVENTION

Wherefore, it is an object of the present invention to overcome the aforementioned problems and drawbacks associated with the prior art systems.

Another object of the present invention is to provide a loan processing system for use by a loan applicant on his or her home or office PC, or at a PC of the lending institution, to accurately complete and file a loan application.

A further object of the invention is to provide mechanism for analyzing the loan files so that the lending institution may make better use of employees and of its advertising resources.

Another object of the invention is to provide on-line help via built-in instruction or via a modem link with the lending institution so that the lending institution may directly query the loan applicant on-line as to any misstatements, inaccuracies or incomplete responses or provide assistance to the loan applicant.

A still further object of the invention is to minimize the amount of paper work generated by the lending institution as well as standardize all of the form used during the loan process.

SUMMARY OF THE INVENTION

The invention relates to a system for electronically processing a loan application of a loan applicant by a lending institution, said system comprising a data display device, connected to said system and responsive to posed questions, for displaying a plurality of questions to be posed to the loan applicant, said plurality of posed questions being directed at obtaining necessary information from the loan applicant to complete the loan application; an input device, connected to said system, for inputting the necessary information from the loan applicant in response to said plurality of posed questions into the system in order to complete said loan application of the loan applicant; a storage medium, connected to said system, for storing an electronic loan data file which incorporates at least said inputted necessary information; and a first data processing device, connected to said system and responsive to said stored electronic loan data file, for processing said electronic loan data file to assist with determining whether the loan application should be approve.

The invention further relates to a method for electronically processing a loan application of a loan applicant by a lending institution, said method comprising the steps of: displaying, via a data display device connected to a system, a plurality of questions to be posed to the loan applicant, said plurality of posed questions being directed at obtaining necessary information from the loan applicant to complete the loan application; inputting, via an input device connected to said system, the necessary information from the loan applicant in response to said plurality of posed questions into the system in order to complete said loan application of the loan applicant; storing, via a storage medium connected to said system, an electronic loan data file which incorporates at least said inputted necessary information; and processing, via a first data processing device connected to said system and responsive to said stored electronic loan data file, said electronic loan data file to assist with determining whether the loan application should be approve.

BRIEF DESCRIPTION OF THE DRAWINGS

The invention will now be described, by way of example, with reference to the accompanying drawings, in which.

DETAILED DESCRIPTION OF THE INVENTION

Figure 1:
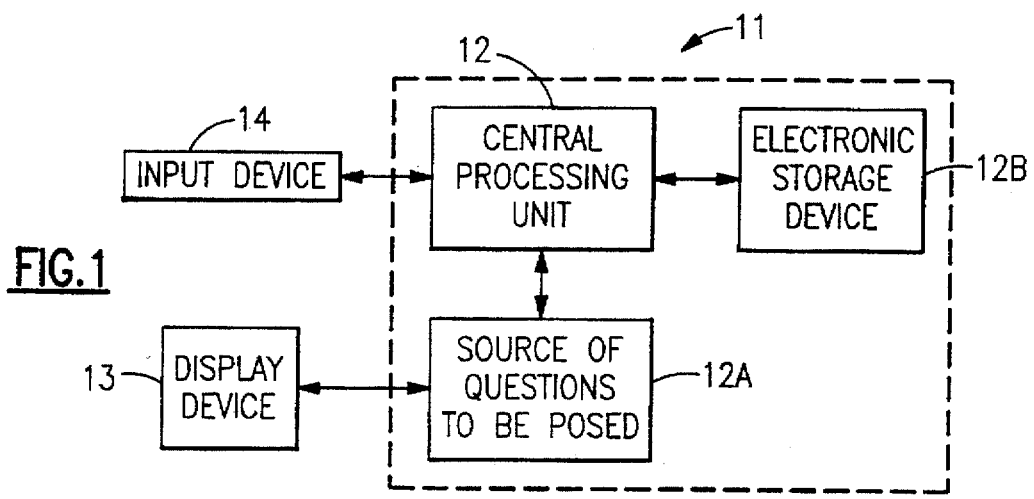
FIG. 1 is a diagrammatic representation of a basic system according to the present invention.

Many financial institutions have in the past avoided true small business lending since the individual loan profitability is marginal at best. Small business lending has always required the same staff, expense and time to deliver the product as the more profitable large loans require.

With the system according to the present invention, the commercial lending process has become streamlined and automated from the initial application to the final approval. In addition, much of the application process also become standardized, such as business plan requirements, financial data and credit scoring, thus, much of the staff expenses and time associated with providing small business loans is greatly reduced.

Some of the benefits of the present invention are highlighted below:

1. The system provides standardized and integrated business planning format which includes financial information (income statement, cash flow, balance sheet, break-even analysis, business ratios and highlights), business plan text (with tutorial and outline) and graphics capability. Because the system includes user friendly and fully integrated software, loan applicants (the loan applicant) need only enter the required raw data—the financial statements and analysis are automatically generated by the system. This process requires less outside resources and saves the loan applicant considerable up-front time and expense.

2. The computer system contains a commercial loan application (lending institution re-definable as desired) which can be transmitted (via electronic communication or via sending a disk) along with the financial statements and business plan directly to the loan officer in charge of the application. Fees can be paid directly from the loan applicant using a check number or a credit card number.

3. The computer system is networkable within the lending institution's computer environment and with the loan applicant's PC. Information is transmitted electronically, or delivered via a disk, minimizing and/ or eliminating the need for excessive human involvement such as meetings or telephone calls, generating and mailing correspondence to the loan applicant, opening and distributing correspondence received from the loan applicant, etc., which generate much of the time and expense associated with small business lending. Since information is available and accessible substantially instantly, the support staff learning curve is significantly reduced thereby saving time and money for the lending institution.

4. The system can verify that the application is complete and that all of the necessary financial statements are accurate prior to automatic routing the loan applicant's information to the credit bureau. Again, much of the loan process is automated to remove the human involvement.

5. The system is a dynamic system via which the loan applicant will use to track the actual expenses against the original business plan. As such, the lending institution can request auditing of the loan applicant's progress electronically, with the loan applicant's prior approval, and update the filing system automatically.

6. The system can transmit an alarm(s), such as a warning message(s) or any notice(s), to a loan applicant regarding adverse action such as an overdraft or to simply notify the loan applicant of a change in the interest rate. The system can also be used as a marketing communication tool by transmitting product information as a mechanism for cross-selling.

In any commercial lending environment, a relatively small percentage of the loan applications are quickly identified as approved or denied. A major group of other loan applications must traverse the entire application process, and the system according to the present invention is designed to handle such loan applications efficiently and very cost effectively. It is an information system, a commercial lending system and a marketing system—all in one product.

Turning first to FIG. 1, the basic system according to the present invention will now be discussed in detail. The system 10 includes a data processing device such as a computer 11 including a central processing unit (CPU) 12, a monitor or other visual display 13, a keyboard or some other input device 14, a source of questions to be posed to the loan applicant 12A, and an electronic storage device 12B. The system operates as follows. Each question to be posed to the loan applicant is sequentially displayed on the display device 13. The loan applicant, in response to each posed question, enters an appropriate response by operating the input device 14. After input of a reply by the loan applicant, the CPU 12 sends a signal to the source of questions to be posed 12A to transmit a next question to the loan applicant. That next question is then displayed on the display device 13 and the loan applicant again enters in a response by operation of the input device 14. This procedure continues until all the information concerning the loan application process is inputted by the loan applicant into the system. Once this occurs, the information is processed by the CPU 12 and/or sent to an electronic storage device 12B. An acceptable electronic storage device 12B could be, for example, a hard disk connected with the computer 11 or could be an electronic media, such as a floppy disk or the like, on which the applicant's loan information is stored.

Figure 2:
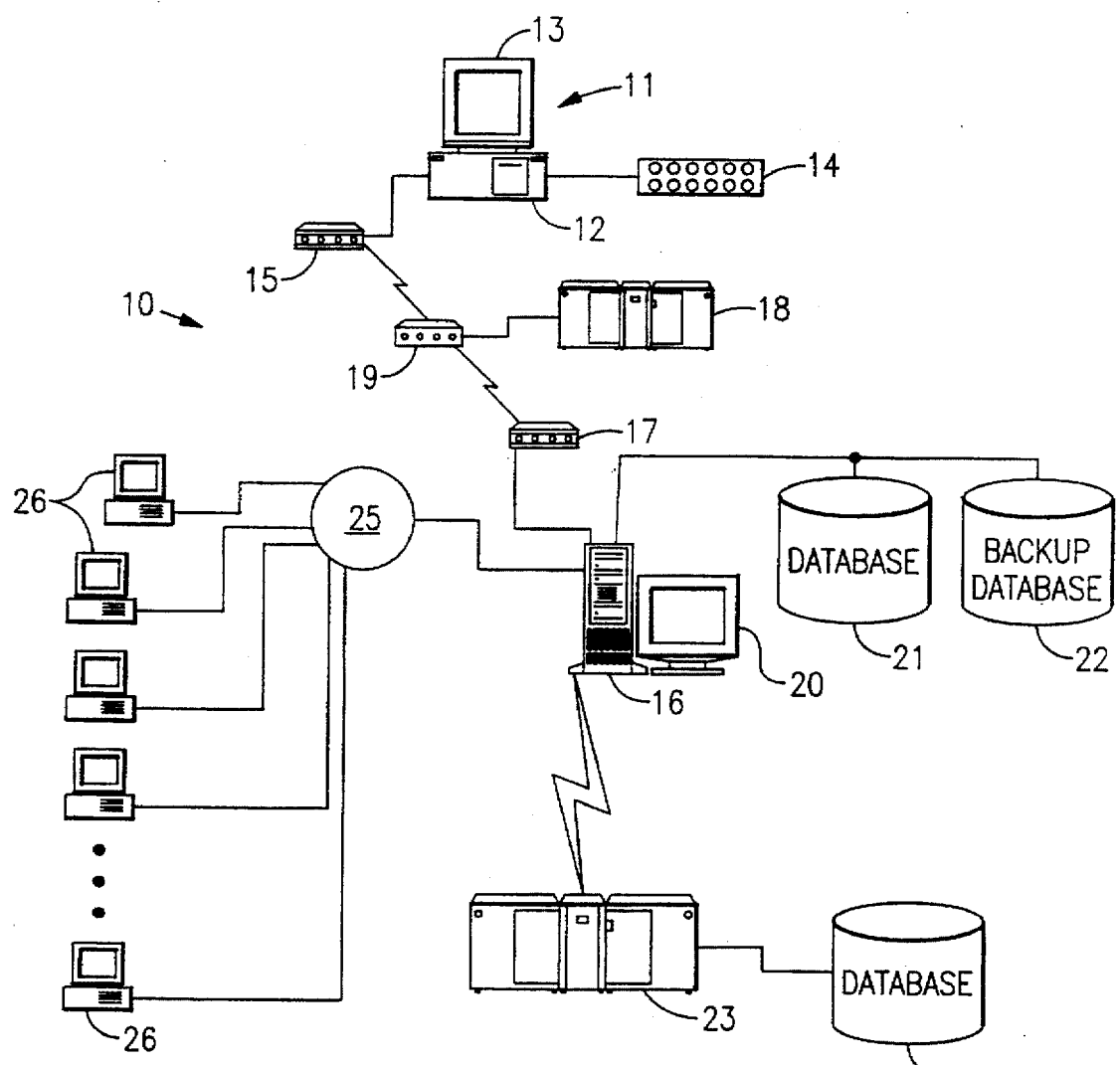
FIG. 2 is a diagrammatic representation of a typical lending institution's system according to the present invention.

Turning next to FIG. 2, a preferred system 10 of the present invention is shown and will be discussed in detail. The system includes a loan applicant computer 11 typically having a CPU 12, a display 13, a keyboard 14, and a modem 15. Of course, other types of computers, such as a pen computer, may be suitable for use as the loan applicant computer 11. The loan applicant computer 11 may be directly connected to the lending institution computer 16, via a lending institution modem 17, or the lending institution computer 16 may be accessed by an on-line service computer 18 having its own modem 19. Alternatively, the loan applicant computer 11 need not be electrically connected to the lending institution computer 16 at all. Instead, the loan applicant will provide a disk, or other magnetic media containing the necessary information to be loaded onto the lending institution computer 16 once the required information is entered. FIG. 2 shows connection to the lending institution computer 16 through the on-line service computer 18. The lending institution computer 16 may also include a display 20, a data base 21 and a back-up data base 22. The lending institution computer 16 is provided access, via a modem, to a credit bureau 23 also having a database 24.

The lending institution computer 16 may include a lending institution computer network 25 having a plurality of PCs 26, each provide access to the entered information to confirm that various criteria relating to the loan are complied with and/or completed. For example, the various lending institution may have one or more personnel or separate departments which are responsible for one or more of the following: overall review of the lending process, review of security issues, review of the marketing of loans, review of legal issues and matters, auditing of the lending institution's books, servicing loans, printing necessary loan documents, entry of disk(s) into the lending institution system, money dispersement, investments, accounting, etc.

Figure 3A:
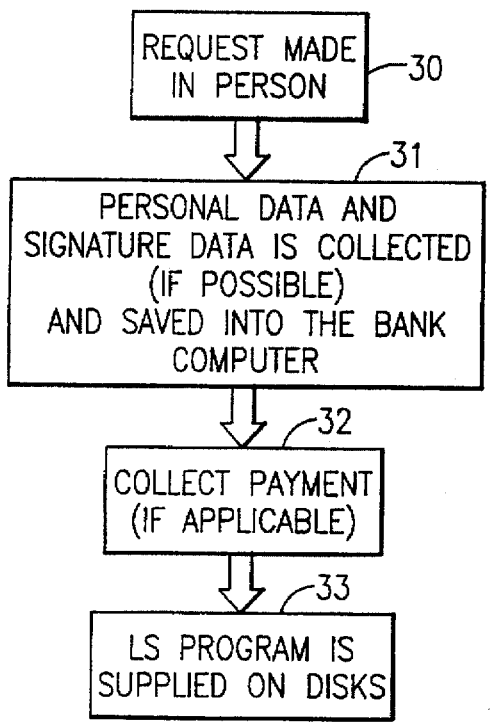
FIGS. 3A–3D are diagrammatic schematic block diagrams of the various requests necessary to commence the loan application process according to the present invention.
Figure 3B:
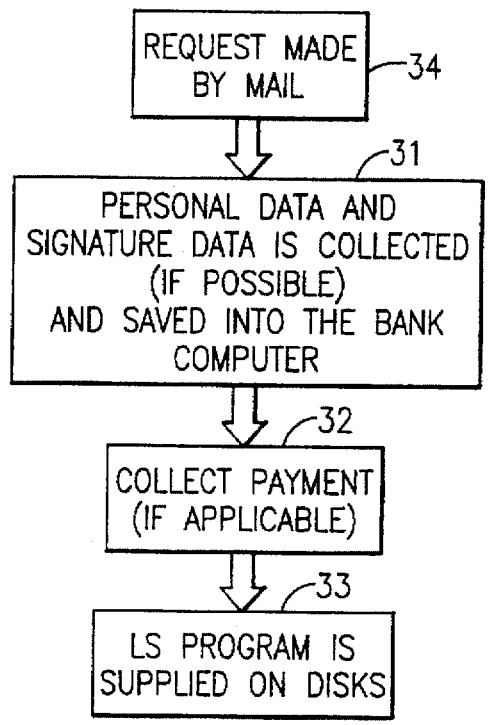

When a loan applicant desires to apply for a lending institution loan, the loan applicant can make the request in a number of ways as shown in FIGS. 3A–3D. FIG. 3A shows the loan applicant requesting, designated by step 30, the loan in person. At step 31, personal data and signature date is collected and saved in the lending institution computer 16. If applicable, any necessary payment is made at step 32. Finally, at step 33, the loan applicant is given the loan software (LS) program 1 supplied on a disk(s) to be used by the loan applicant in his or her computer 11. Similarly, in FIG. 3B the process remains substantially the same except that the loan applicant requests the loan by mail, as shown at step 34, not in person.

Figure 3C:
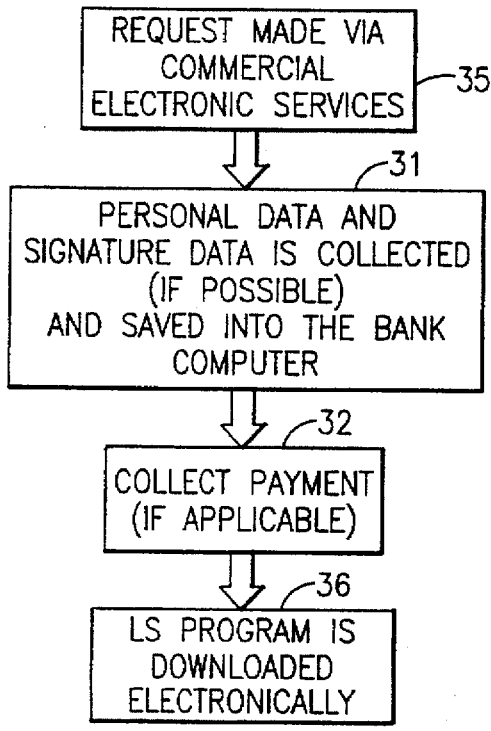
Figure 3D:
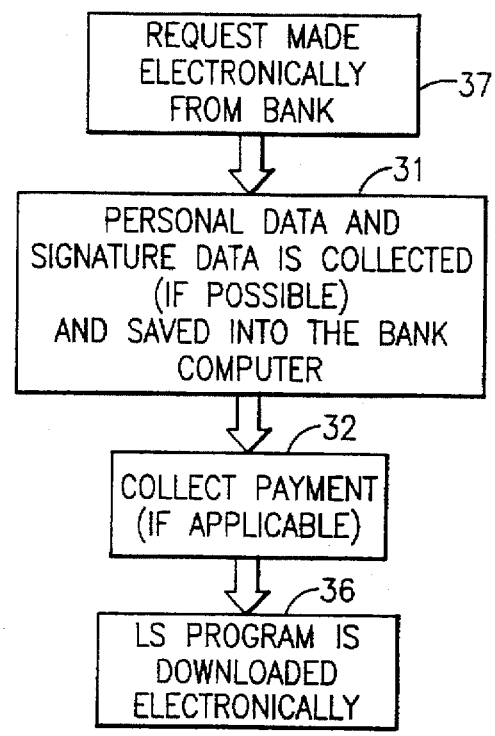

Alternatively, as shown in FIGS. 3C and 3D, the loan applicant may make the request electronically. In FIG. 3C, at step 35, the loan applicant may be linked to a commercial on-line service 18 and make the loan request via that service. The necessary personal data, signature date and any payment is collected at steps 31 and 32 and saved. The LS program 1 is then down loaded, at step 36, to the loan applicant computer 11 via the on-line service 18. In FIG. 3D, at step 37, the loan applicant computer 11 may be directly connected electronically to the lending institution computer 16. The request is similarly made as with respect to FIG. 3C and the LS program 1 is downloaded in the loan applicant computer 11.

Figure 4A:
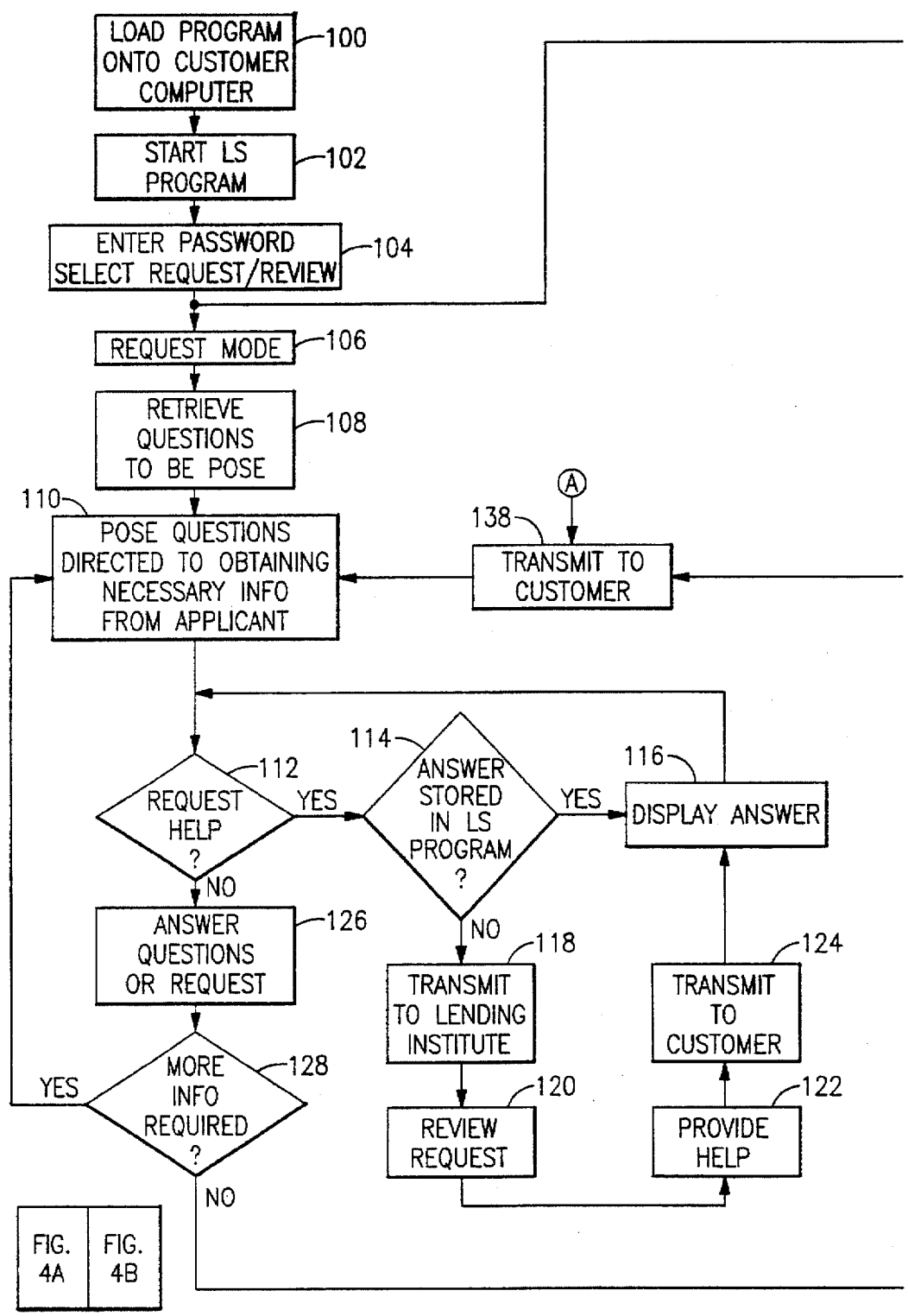
FIG. 4 is a flow chart illustrating operation of the present invention.
Figure 4B:
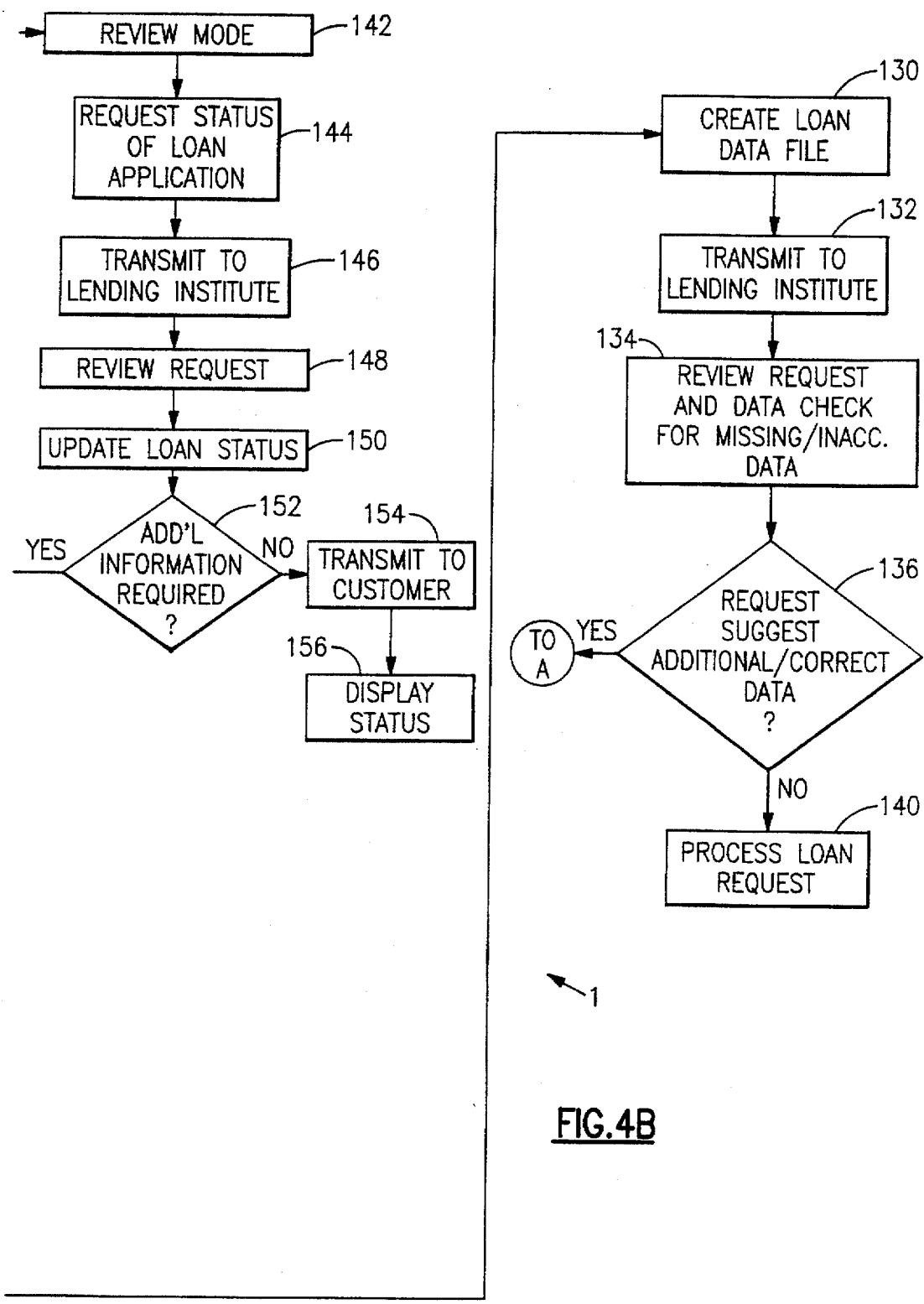

Turning now to FIG. 4, a detail discussion concerning operation of the LS program 1 will now be provided. Initially, at step 100 the LS program 1 is loaded onto the loan applicant's computer 11. Once the program 1 is started, at step 102, the loan applicant enters his or her password and selects whether to enter the "Request Mode" or the "Review Mode" at step 104. Assuming the loan applicant selects the "Request Mode", at step 106, the LS program 1 retrieves, at step 108, the questions to be posed to the loan applicant. The questions to be posed 12A are in a format readily re-definable by the lending institution and directed at extracting the necessary information from the loan applicant to generate all required lending institution forms, e.g. for example the loan application data form, a financial information form, a business plan form, etc. At step 110, the LS program 1 then sequentially poses questions directed at obtaining the necessary information to be included on the various forms such as: on the application form, the name and address of the loan applicant, the date of the request, etc.; on the financial information form, an income statement, cash flow, balance sheets, break-even, business ratios and highlights, etc.; and on the business plan form, depending upon the type of loan requested, a narrative of the loan applicant's business plan. If, during inputting of the requested information, the loan applicant is unclear as how to answer the request, the loan applicant may request "HELP" at step 112, by, for example, striking a designated "HELP" key.

There are at least two ways a request may be answered, as indicated at step 114. First, the "HELP" information may be already stored within the LS program's 1 database. In this case, the LS program 1 displays the answer at step 116 and the LS program 1 returns to the request at step 112 to determine whether the provided explanation is sufficient. If not, the loan applicant can request further and more detailed assistance. Second, the request for "HELP" may be transmitted to the lending institution at step 118, where a lending institution representative reviews the request at step 120, provides the necessary explanation at step 122 and transmits the "HELP" information to the loan applicant at step 124. This information is then displayed at step 116 and the LS program 1 returns to the request at step 112 to determine whether the "HELP" is sufficient as before. Assuming that the "HELP" information is sufficient or that no "HELP" is requested, at step 126, the loan applicant answers the posed question.

At step 128, the LS program 1 determines whether there is sufficient information to proceed with the loan process. If not, and more information is required, the LS program 1 loops back to step 110 so that the loan applicant may input additional information. Once all of the information is inputted and completed by the loan applicant, the LS program 1 creates a loan data file at step 130 for transmission, at step 132, to the lending institution computer 16. When the information is received at the lending institution computer 16, the lending institution reviews the information at step 134, and, at step 136, determines whether the data is sufficient to process the application. If not, a request for additional or corrected data is transmitted by the lending institution to the loan applicant at step 138. If the data is sufficient, the lending institution continues with internal processing of the loan at step 140. Finally, all necessary loan forms and other associated documentation, required to formalize the loan from the lending institution, is printed, at step 78. Thereafter, these documents can be reviewed by the parties and signed and dated, where necessary, if such loan forms and other associated documentation are acceptable.

The "Review Mode" of the invention will now be discussed. If, at step 104, the loan applicant selected the "Review Mode", assuming the loan request is already being processed (see discussion with respect to FIG. 5 below), the LS program 1 enters the "Review Mode" at step 142 where the loan applicant, at step 144, requests a status update of the loan application. This request is electronically, transmitted via a modem, for example, to the lending institution at step 146. The lending institution, at step 148, reviews the request and at step 150 updates the loan status. If, at step 152, the update reveals that additional information is required to process the loan, the request for additional information is transmitted to the loan applicant at step 138. Thus, the LS program 1 enters the "Request Mode" so that the loan applicant may provide the additional required information by proceeding as discussed above. If no additional information is required, as determined at step 152, a response is transmitted to the loan applicant at step 154 and the status of the loan application is displayed to the loan applicant at step 156. The provided loan status will indicate which step(s) of the loan application process were completed by the lending institution and which step(s) are not yet completed. This way, the loan applicant can obtain a current status of his or her loan. It is to be appreciated that the "Review Mode" typically will only provide the loan applicant with limited access, e.g. will only be able to read such information and not be able to alter the information.

Figure 5A:
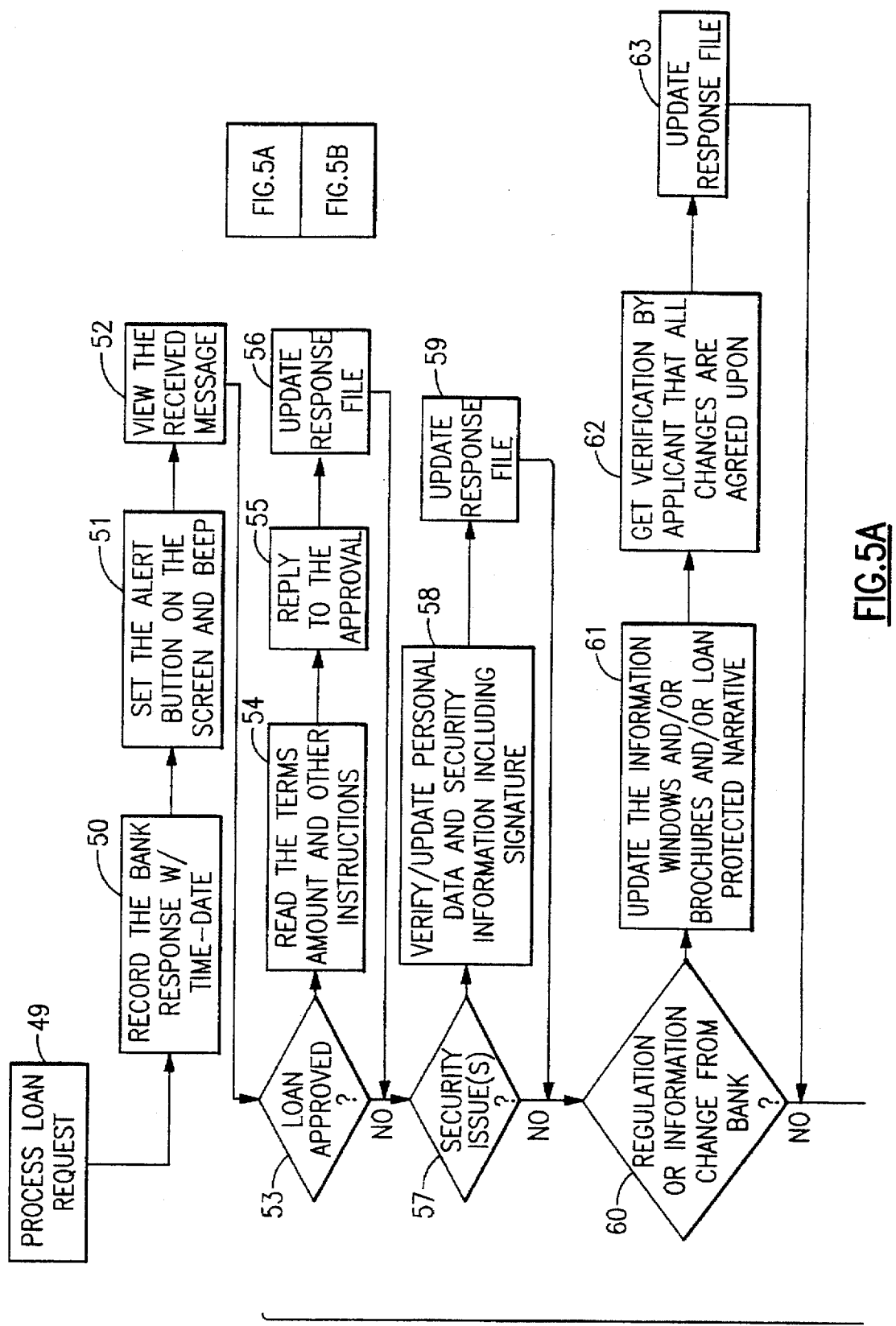
FIG. 5 is a flow chart illustrating processing of a loan request according to the present invention.

With reference to both FIGS. 2 and 5, a further discussion of the loan application processing will now be provided. Once the loan data file is transmitted to the lending institution computer 16, the lending institution computer 16 records the time and date of the transmission, at step 50. Next, at step 51, a message is set to notify loan applicant of any changes in the loan process, such as a change in interest rates. At step 52, the lending institution reviews the transmission to determine that it is a loan request. The loan data file then enters the lending institution computer network 25 typically comprising the plurality of PCs 26. Each site networked to the lending institution computer network 25 then has access to the loan file to perform a specific task relating to the processing of the loan.

It should be noted that, since the loan data file is on the network 25, the various personnel and/or departments need not perform their respective function in the exact order shown in FIG. 5. However, each function will be described in the order shown for the sake of simplicity. The person responsible for lending, at step 53, determines whether the loan is approved or should not be approved. Next, the loan terms are reviewed at step 54 and a reply to the approval is sent at step 55. At step 56, the lending department updates the file according to its decision. The person responsible for security, at step 57, processes any security issues of the loan. Data, such as signatures, personal information, etc. is verified at step 58. At step 59, the file is updated. The person responsible for marketing, the person responsible for auditing and/or the person responsible for legal, at step 60, review the file to ensure that any changes in lending institution information or regulation is complied with. At step 61, the information is updated and, at step 62, the loan applicant verifies that the changes are accurate and agreed to. At step 63, the file is updated. The person responsible for customer service and/or accounting, at step 64, next reviews any payment issues. If necessary, at step 65, a request for payment of any necessary fee(s) is sent to the loan applicant. Payment may be made in any conventional manner or can be made electronically. At step 66, the file is updated. The person responsible for money and the person responsible for investment, at step 67, determines whether the information supplied is adequate. If necessary, at step 68, an update of the various financial statements and business plans is requested. At step 69, the file is updated. The person responsible for lending and/or the person responsible for auditing, at step 70, determine whether the loan file is complete in all respects. If necessary, at step 71, an update of the information is requested. At step 72, the file is updated. The person responsible for lending, at step 73, then provides a final review to ensure all necessary action has been completed. If necessary, at step 74, any necessary or appropriate action is then taken. At step 75 the file is updated. The person responsible for lending, if the information is updated, at step 76, makes a final check prior to dispersing any money at a closing date and saving the information in the database 21.

To provide the marketing services and to provide the dynamic aspects of the system as described above, the loan applicant, assuming the loan has been approved, can monitor his or her actual performance with that of the original request as now stored in the lending institution databases 21 and 22. Through modems 15, 19 and/or 17, the loan applicant will have continued access to the lending institution as well as the lending institution having continued access to the loan applicant, if desired. This enables the loan applicant to determine, once connected to the lending institution's database, what further processing of the loan application by the lending institution is necessary prior to the funds being disbursed. In this respect, both the loan applicant and the lending institution can monitor performance as originally anticipated.

It is to be appreciated that the system, according to the present invention, can be provided with suitable passwords so that the loan applicant is only provided with access to that particular loan applicant's data file which is stored in the database 21 of the lending institution. In addition, software of the system is protected so that the loan applicant will only have read only privileges to view the information but will not be authorized to make any corrections to such information other than as shown in FIG. 4. Further, for the loan processing steps shown in FIG. 5, if desired, the loan applicant will merely have the ability to view whether steps 53, 57, 60, 64, 67, 70 and 73 have been completed by the lending institution but will not have access to any of the other information relating to those steps. For example, the loan applicant may be linked up to the lending institution's database 21 and determine that steps 53, 60, 67, 70 have been completed while steps 57, 70 and 73 are not yet completed.

Figure 6:
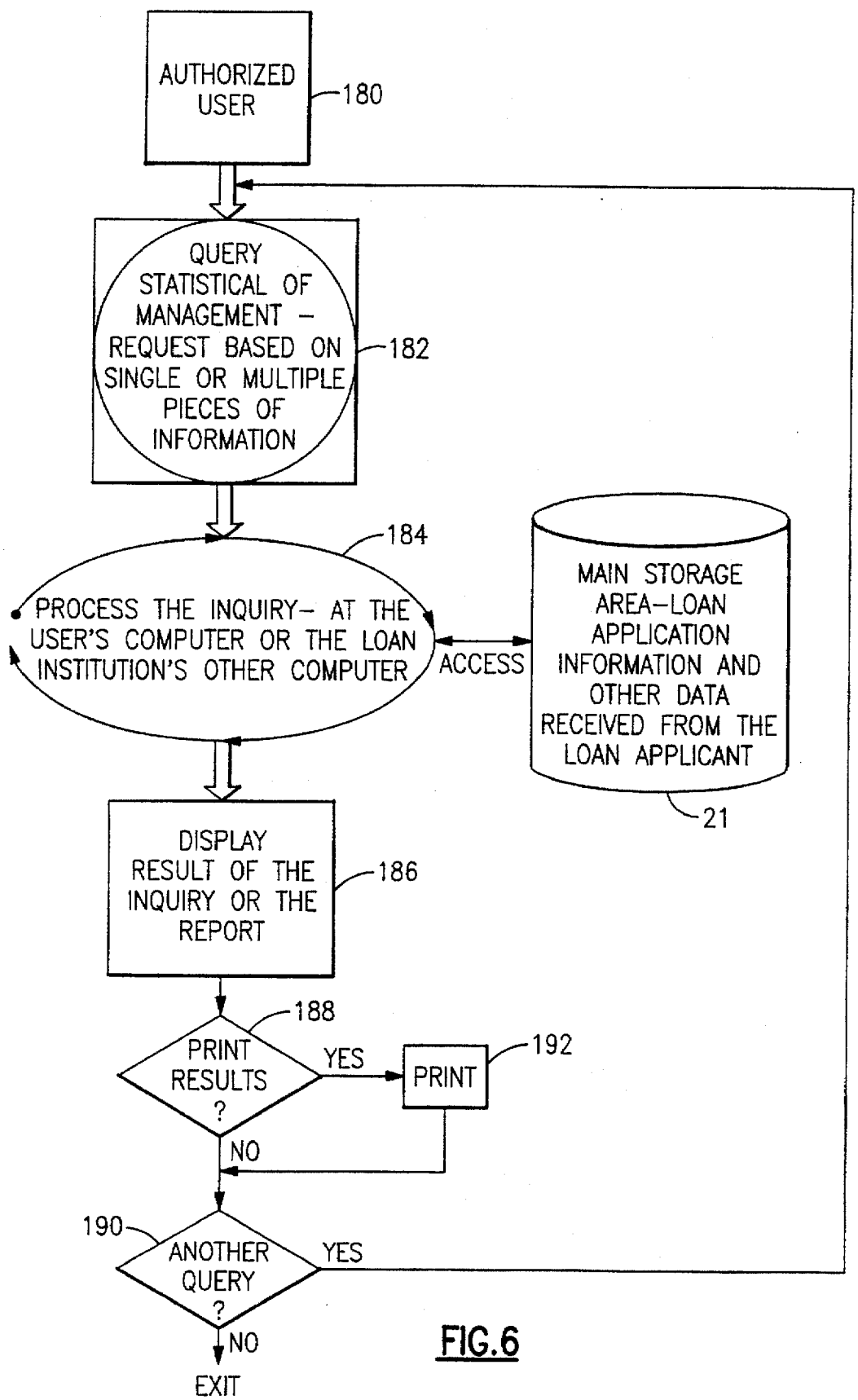
FIG. 6 is a diagrammatic flow chart illustrating how statistical information concerning the loans of the lending institution can be generated.

Turning now to FIG. 6, a description concerning how the information saved in the database 21 of the lending institution can be utilized to generate reports or other complied information. An authorized user enters his or her password, at step 180, into the system and, assuming that the user is authorized to use the system, the user is provided access to the statistical report sub-routine. At step 182, the user enters the desired statistical or management request query which can be based upon a single piece of information or multiple information that is to be processed by the CPU which has access to the main database 21 of the lending institution. Once the inputted statistical or management request query is processed, the complied or generated information is then displayed, at step 186, on a suitable display, e.g. display 20 or one of the displays of the remote PCs 26. At step 188, the user is asked whether the results should be printed. If the user does not desire to print the results, e.g. the user enters "NO", the system then proceeds to step 190 where the user is asked whether another query is to be entered. In the event that the user desires to pursue another inquiry, the system then proceeds to step 182 where the additional query is entered. If no additional query is desired, the system exists this sub-routine. If, at step 188, the user desires to print the results, the system then prints the results via a desired printer, at step 192, and returns to step 190 to inquire whether the user would like to pursue another inquiry.

Statistical and management can be generated on demand internally by the loan institution or externally by an auditor of the loan institution. The reports can be based upon any combination of information which may be extracted from the loan applications on file, e.g. the race of the loan applicants, the location or neighborhood of the loan applicants, the amount of loans, the type of loans, the years of education of the loan applicants, the sex and/or marital status of the loan applicants, the assets of the loan applicants, the reason for loan, etc., as well as other information that the lending institution may be able to obtain or extract from the loan applicants or from the credit reports or the like.

The benefits of such reports is that it saves time, reduces paper work and facilitates quick access to the performance of various products of the lending institution. The officials at the loan institution can identify, on demand, the strengths and weakness of each product, the prosperity of any offered product as well as the performance of each branch of the lending institution so that its easy to modify and improve the product or service as well as minimized or eliminate any tampering with a loan application.

Another important feature of the present invention is that the lending institution has the ability to quickly update each an every form due to any change in the relevant laws or any change in criteria or policy of the lending institution. The lending institution also has the ability to modify the content of the questions to be posed to the loan applicant to take into consideration such change in the relevant laws or any change in criteria or policy of the lending institution. When necessary or desired, the lending institution can forward the revised form, concerning a law change or a policy change of the lending institution, and obtain the loan applicant's acceptance and agreement to the same.

When the loan applicant enters the "Review Mode", the loan applicant merely has the ability to scan his or her entire file. All correspondence, messages, memos, documentation, queries, etc. as well as any correspondence provided between the loan applicant and the lending institution is saved chronologically in the loan applicant's data file. If any correspondence is forwarded by mail to the lending institution, such information can be readily scanned into the system and saved in the loan applicant's data file to provide a complete and accurate electronic file which records each and every aspect of the lending transaction. In addition, all flags or the warning messages provided during the loan application process can also be documented and chronologically recorded so that verification of any necessary response or action to such flags or warning messages can be readily determined.

A further benefit of the present invention is that once the loan applicant has applied for a loan with the lending institution, it is very easy for that loan applicant to obtain a further loan. The loan applicant merely has to update the relevant data file and forward the same to the lending institution for processing as hereinbefore described.

Since certain changes may be made in the above described system, without departing from the spirit and scope of the invention herein involved, it is intended that all subject matter described above or shown in the accompanying drawings shall be interpreted merely as examples illustrating the inventive concept herein and shall not be construed as limiting the invention.

What is claimed is:

1. A system, having bi-directional communication capabilities, for electronically processing a loan application of a loan applicant by a lending institution, said system comprising:

a data display device, connected to said system and responsive to posed questions, for displaying a plurality of questions to be posed to the loan applicant, said plurality of posed questions being directed at obtaining necessary information from the loan applicant to complete the loan application;

an input device, connected to said system, for inputting the necessary information from the loan applicant, in response to said plurality of posed questions, into the system in order to complete said loan application of the loan applicant;

a storage medium, connected to said system, for storing an electronic loan data file which incorporates at least said inputted necessary information;

a first data processing device, connected to said system and responsive to said stored electronic loan data file, for processing said electronic loan data file to assist said lending institution with determining whether the loan application should be approved; and said system including both a request mode of operation and a review mode of operation, so that said system, when in said request mode of operation, extracts the necessary information from the loan applicant to generate all required lending institution forms while said system, following commencement of processing of said loan application by said lending institution but before a final determination concerning said loan application and when in said review mode of operation, facilitates review the loan application, by said loan applicant, so that said loan applicant may monitor processing of the loan application and determine the status of the loan application via bi-directional communication with the lending institution without having to communicate directly with a loan officer of said lending institution.

2. A system according to claim 1, wherein said first data processing device, responsive to the inputted necessary information concerning the loan applicant, generates each necessary application form required by the lending institution in a format authorized by and acceptable to the lending institution;

said system, when is said review mode of operation, only allowing said loan applicant to read certain information concerning said loan application of said loan applicant but not authorizing said loan applicant to make any corrections to said loan application of said loan applicant but only respond to information requested by said lending institution; and said systems including means for supplying warnings messages and notices to said loan applicant, after submission of said loan application to said lending institution but prior to a final determination of the loan, relating to possible problems determined by said lending institution and changes made by said lending institution in the loan process.

3. A system according to claim 2, wherein said data display device, said input device, said storage medium and said first data processing device are all directly connected with one another; and said system automatically generates at least said loan application and a business plan, for a loan application, in a format designated by said lending institution.

4. A system according to claim 2, wherein said system includes a second data processing device and at least said data display device, said input device and said second data processing device are part of a remote site, and said remote site is provided with a mechanism facilitating electronic communication with said first data processing device located at said lending institution.

5. A system according to claim 4, wherein said mechanism facilitating electronic communication comprises a first electronic communication device connected to said first data processing device and a second compatible electronic communication device connected to said remote site, and said first and second electronic communication devices are connectable to one another to facilitate at least one of: (1) communication of at least said electronic loan data file from said remote site to said first data processing device; (2) requesting additional necessary information from the loan applicant, if further applicant information is required by said lending institution; and (3) requesting assistance by the loan applicant from the lending institution in order to process the loan application and expedite completion of the loan application.

6. A system according to claim 5, wherein said first data processing device is connected to at least one remote access site of said lending institution, and said at least one remote access site is provided with access to said electronic loan data file for analysis.

7. A system according to claim 4, wherein said mechanism facilitating electronic communication between said first data processing device located at said lending institution and said first data processing device located at said remote site is a magnetic disk.

8. A system according to claim 2 wherein said system further comprises a help mechanism, coupled to said system, for providing assistance to the loan applicant, when necessary, said help mechanism comprises both (1) stored help information in memory, and (2) communication with said first data processing device of said lending institution to supply a request for help to said lending institution and provide help information supplied by said lending institution, via bi-directional communication with any employee at said lending institution, in response to the request for help.

9. A system according to claim 2, wherein said system further comprises means for chronologically saving all correspondence and all documented communications concerning said loan application in said electronic loan data file of said loan applicant so that a complete electronic data file, which records each and every aspect of the lending transaction, is generated;

said system including means for keeping track of each specific task, relating to processing of said loan application, as each said specific task is completed in any desired order, prior to approving said loan application, to facilitate monitoring of said loan application process; and print means for printing the documentation necessary for formalization of an approved loan.

10. A system according to claim 2, wherein said system further comprises a mechanism facilitating electronic communication with a credit bureau service to facilitate expedited retrieval of credit history information concerning the loan applicant.

11. A method for electronically processing a loan application of a loan applicant by a lending institution, said method comprising the steps of:

displaying, via a data display device connected to a system, a plurality of questions to be posed to the loan applicant, said plurality of posed questions being directed at obtaining necessary information from the loan applicant to complete the loan application;

inputting, via an input device connected to said system, the necessary information from the loan applicant, in response to said plurality of posed questions, into the system in order to complete said loan application of the loan applicant;

storing, via a storage medium connected to said system, an electronic loan data file which incorporates at least said inputted necessary information;

processing, via a first data processing device connected to said system and responsive to said stored electronic loan data file, said electronic loan data file to assist said lending institution with determining whether the loan application should be approved; and providing both a request mode of operation and a review mode of operation, so that, when in said request mode of operation, the necessary information from the loan applicant is extracted to generate all required lending institution forms while, following commencement of processing of said loan application by said lending institution but before a final determination concerning said loan application and when in said review mode of operation, allowing review of the loan application, by said loan applicant, so that said loan applicant may monitor processing of the loan application and determine the status of the loan application via bi-directional communication with the lending institution without having to communicate directly with a loan officer of said lending institution.

12. A method according to claim 11, further comprising the steps of:

generating, via said first data processing device which is responsive to the inputted necessary information concerning the loan applicant, each necessary application form required by the lending institution in a format authorized by and acceptable to the lending institution;

only allowing, when is said review mode of operation, said loan applicant to read certain information concerning said loan application of said loan applicant but not authorizing said loan applicant to make any corrections to said loan application of said loan applicant but only respond to information requested by said lending institution; and supply desired warnings messages and notices to said loan applicant after submission of said loan application to said lending institution but prior to a final determination of the loan, relating to possible problems determined by said lending institution and changes made by said lending institution in the loan process.

13. A method according to claim 12, further comprising the step of directly connecting said data display device, said input device, said storage medium and said first data processing device with one another; and automatically generating at least said loan application and a business plan, for a loan, in a format designated by said lending institution.

14. A method according to claim 12, further comprising the steps of providing said system with a second data processing device and electrically connecting at least said data display device, said input device and said second data processing device with one another to form a remote site; and providing said remote site with a mechanism facilitating electronic communication with said first data processing device located at said lending institution.

15. A method according to claim 14, further comprising the step of providing said first data processing device with a first electronic communication device and providing said second data processing device with a second compatible electronic communication device, and providing communication between said first and second electronic communication devices to facilitate at least one of: (1) communication of at least said electronic loan data file from said remote site to said first data processing device; (2) requesting additional necessary information from the loan applicant, if further applicant information is required by said lending institution; and (3) requesting assistance by the loan applicant from the lending institution in order to process the loan application and expedite completion of the loan application.

16. A method according to claim 15, further comprising the step of connecting said first data processing device to at least one remote access site of said lending institution, and providing said at least one remote access site with access to said electronic loan data file for analysis.

17. A method according to claim 14 further comprising the step of providing a magnetic disk as said mechanism facilitating electronic communication between said first data processing device located at said lending institution and said first data processing device located at said remote site.

18. A method according to claim 12 further comprising the step of providing a help mechanism, coupled to said system, for providing assistance to the loan applicant, when necessary, said help mechanism providing both (1) stored help information in memory, and (2) communication with said first data processing device of said lending institution, via bi-directional communication with any employee at said lending institution, to supply a request for help to said lending institution and provide help information supplied by said lending institution in response to the request for help.

19. A method according to claim 12, further comprising the step of providing a mechanism facilitating electronic communication, coupled to said system, with a credit bureau service to facilitate expedited retrieval of credit history information concerning the loan applicant.

20. A method according to claim 11, further comprising the steps of: chronologically saving all correspondence and all documented communications, concerning said loan application, in said electronic loan data file of said loan applicant so that a complete electronic data file, which records each and every aspect of the lending transaction, is generated;

keeping track of each specific task, relating to processing of said loan application, as each said specific task is completed in any desired order, prior to approving said loan application, to facilitate monitoring of said loan application process; and printing, following approval of said loan application, the documentation necessary for formalization of an approved loan.

* * * * *

US005699527C1

(12) EX PARTE REEXAMINATION CERTIFICATE (6121st)

United States Patent
Davidson

(10) Number: US 5,699,527 C1
(45) Certificate Issued: Feb. 19, 2008

(54) METHOD AND SYSTEM FOR PROCESSING LOAN

(75) Inventor: David Edward Davidson, Worcester, MA (US)

(73) Assignee: David E. Davidson, Raanana (IL)

Reexamination Request:
No. 90/008,426, Jan. 16, 2007

Reexamination Certificate for:
Patent No.: 5,699,527
Issued: Dec. 16, 1997
Appl. No.: 08/432,096
Filed: May 1, 1995

(51) Int. Cl.
G06Q 40/00 (2006.01)
G06F 17/00 (2006.01)

(52) U.S. Cl. .............................. 705/38; 705/42; 705/44
(58) Field of Classification Search ........................ None
See application file for complete search history.

(56) References Cited

U.S. PATENT DOCUMENTS

| 4,567,359 A | 1/1986 | Lockwood |
| 4,727,243 A | 2/1988 | Savar |
| 4,734,563 A | 3/1988 | Lloyd |
| 4,736,294 A | 4/1988 | Gill et al. |
| 4,794,530 A | 12/1988 | Yukiura et al. |
| 4,799,156 A | 1/1989 | Shavit et al. |
| 4,812,628 A | 3/1989 | Boston et al. |
| 4,831,526 A | 5/1989 | Luchs et al. |
| RE32,985 E | 7/1989 | Nagata et al. |
| 4,876,648 A | 10/1989 | Lloyd |
| 4,947,028 A | 8/1990 | Gorog |
| 4,949,278 A | 8/1990 | Davies et al. |
| 4,988,849 A | 1/1991 | Sasaki et al. |
| 4,994,964 A | 2/1991 | Wolfberg et al. |
| 5,120,906 A | 6/1992 | Protheroe et al. |
| 5,193,057 A | 3/1993 | Longfield |
| 5,220,501 A | 6/1993 | Lawlor et al. |
| 5,239,432 A | 8/1993 | Kuroda |
| 5,239,462 A | 8/1993 | Jones et al. |
| 5,259,066 A | 11/1993 | Schmidt |
| 5,262,941 A | 11/1993 | Saladin et al. |
| 5,305,434 A | 4/1994 | Ballard et al. |
| 5,383,113 A | 1/1995 | Kight et al. |
| 5,398,300 A | 3/1995 | Levey |

(Continued)

FOREIGN PATENT DOCUMENTS

| JP | H04-195256 | 7/1992 |
| JP | 5-101250 | 4/1993 |
| JP | 6-243157 | 2/1994 |

OTHER PUBLICATIONS

Citibank to Offer 15–Minute Mortgages in New York Area, *PR Newswire Association, Inc., PR Newswire*, Nov. 22, 1989, 2 pages.

Gillin, P., "Loans Processing System Out for IBM CPUs", *Computerworld*, Apr. 9, 1984, 1 page.

"A Cafeteria of Services (insurance agency automation)," Sklenar, Robert R., *Best's Review—Property/Casualty Insurance Edition*, vol. 85, No. 1, pp. 64–66, 116, May 1984.

(Continued)

*Primary Examiner*—Jeanne M. Clark

(57) ABSTRACT

A loan processing system to aid a potential loan applicant preparing the necessary financial statement, loan application, and business plan to apply for a business loan. The loan applicant merely completes the requested information using a computer and transmits the completed information to the lending institution via modem or by mailing the information stored on disk. The lending institution then reviews the transmitted information, checks for inaccuracies, completeness, etc. and responds accordingly. If the loan applicant, in filing out the loan application, has any questions or, if the lending institution has any questions upon receipt of the information, the loan applicant and lending institution may communicate with one another on-line to respond to the query or via mail, e.g. mail a disk with the necessary questions or requests. The system also includes a "HELP" mechanism to access stored information to aid in the preparation of the loan application.

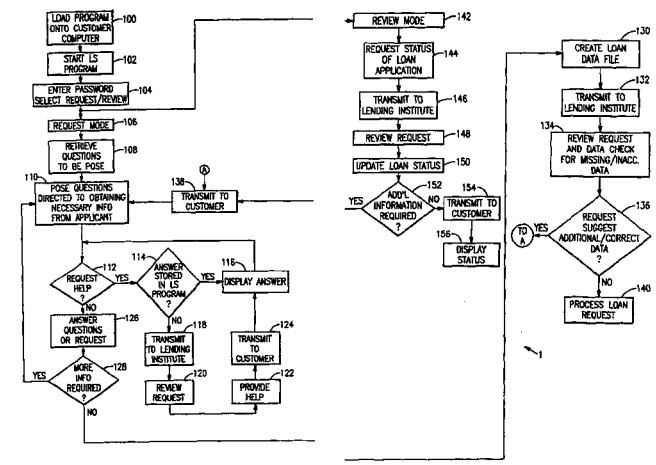

U.S. PATENT DOCUMENTS

| | | | |
|---|---|---|---|
| 5,475,403 A | 12/1995 | Havlovick et al. | |
| 5,481,647 A | 1/1996 | Brody et al. | |
| 5,576,951 A | 11/1996 | Lockwood | 395/227 |
| 5,583,760 A | 12/1996 | Klesse | |
| 5,598,474 A | 1/1997 | Johnson | |
| 5,669,527 A | 9/1997 | Davidson | 395/238 |
| 5,732,397 A | 3/1998 | DeTore et al. | |
| 5,774,882 A | 6/1998 | Keen et al. | |
| 5,797,133 A | 8/1998 | Jones et al. | |
| 5,870,721 A | 2/1999 | Norris | 705/38 |
| 5,930,776 A | 7/1999 | Dykstra et al. | |
| 5,940,811 A | 8/1999 | Norris | |
| 6,105,007 A | 8/2000 | Norris | |
| 5,940,811 C1 | 12/2005 | Norris | |
| 6,105,007 C1 | 7/2006 | Norris | |

OTHER PUBLICATIONS

"A Private Investigator's Guide to Un–Covering Concealed Assets"; Karson, Daniel E., Mar. 4, 1987; p. 6, vol. 152, No. 43.

"Assignment for Survival: Reinvent the Bank," The American Banker, Comment, p. 4, May 19, 1992.

"Automation at the Point of Sale (insurance agents)," Dixon, Lang, Best's Review–Life Health Insurance Edition, v84, p. 62(2), May 1983.

"Banking of the Future," Orange County Register (California), Thursday Evening Edition, Business, p. C01, Jan. 29, 1987.

"BayBanks Automates Loans," The American Banker, Nov. 1, 1989.

"Billing Systems: they aren't just for billing anymore," Cellular Business, vol. 9, No. 12, p. 24 (Nov. 1992).

"Branch Automation Project was Ahead of its Time," ABA Banking Journal, Computers & Operations, p. 66, Feb. 1992.

"Business Report: On Banking," The Atlanta Journal and Constitution, Business, Section F, p. 2 (Sep. 18, 1992).

"Bye–bye Paper," ABA Banking Journal, Apr. 1990, p. 95.

"Card Processing System is Revamped," ABA Banking Journal, New Products & Services, p. 72, Dec. 1992.

"Cautious Mortgage Lenders Redo Their Sums", Barchard, David, Financial Times, Sat. Jun. 20, 1992, p. 6.

Chain Store Age Executive v68n7 (Section 2) pp. 14–15, Dialog fie 15, Accession No. 00727315, Jul. 1992.

"Commercial Credit Tests Loan System; Finance Firm Looks to Make Most of Deal with Barclays," The American Banker, Technology Today, p. 6, Dec. 27, 1989.

"Computer Help for Insurance Agencies," Campbell, M., PC Magazine, v3, N25, pp. 301–303 (Dec. 25, 1984).

"Credit Checks: Wireless on New Platform," Bank Systems & Technology, Nov. 1994, vol. 31, No. 11, pp. 22–24.

"Decision–Making Business Software May be What Doctor Ordered," Los Angeles Times, Orange County Edition, Business, Part 4, p. 8, col. 1, Jul. 12, 1987.

The RDS Report on the Future of Retail Banking Delivery, BAI, 1994, 87 pages.

"EDS after Perot: How Tough is It?" Fortune, Corporate Performance, p. 72, Oct. 24, 1988.

"Enhanced Credit Bureau Check," ABA Banking Journal, New Products and Services, p. 152, Oct. 1988.

"Financial Services Firm Upgrades Its Network Using 5–step plan;" On–Line Financial Services, Inc., Networking Management, vol. 8, No. 1, p. 69 (Jun. 1990).

"FIS announces acquisition of Louisiana Companies," Computer Division Inc. at MBA Conference, Business Wire, Mar. 30, 1993.

"Focus on Strength and Relationship Building: Marketing Developments in Delaware Valley Banks," Bank Marketing, vol. 24, No. 1, p. 18 (Jan. 1992).

"Freestyle–Ven/Telecash; Freestyle Centures Inc. announces consummation of merger with Telecash Advance of Utah, Inc.," Business Wire, Nov. 10, 1988.

"IBM Users Get 'Credicheck'," Computerworld, Software & Services, p. 69, May 10, 1982.

Info/Technology, p. 23, National Mortgage News, Oct. 5, 1992.

"Innovative Credit Processing & Management System Debuts Automated Credit Processing at Perpetuall," PR Newswire, Sep. 19, 1988.

"Keeping the Pieces Together," Russell, Rebecca D., Security, vol. 28, No. 5, May 1981, "Abstract".

"Kiosk Issues Bank Cards for those Dashing Through Dough", Berzof, Ken, The Courier–Journal (Louisville, KY, US), V269 N155 sB p. 12, Dialog file 635, Accession No. 0117523, 1989.

"Lenders Speed Up Approval Procedure, Use Toll–Free Numbers for Convenience," The American Banker, Dec. 31, 1987.

"ManTec 3.4"; Management Technologies Inc (MTI); DIALOG File 01198196; 1982.

"Mining the Technological Benefits," Retail Banker International, p. 14, May 13, 1994.

"New Ways to Automate Auto Loan Process," The American Banker, Automation Ideas Section, vol. 5, No. 30, p. 3.

"PEP+ (Paperless Processing Plus)," Servantis Systems, Inc., DIALOG File 256 (01513881), Jan. 1986.

"Software Package Aids Mortgage Management," ABA Banking Journal, Oct. 1983, p. 140.

"Software" (for loan processing) (column), Rich, Jason R., Mortgage Banking Aug. 1990, vol. 50, No. 11, p. 67(3).

"Special Delivery; automation of mortgage banking," Mortgage Banking, vol. 52, No. 6, p. 10, (Mar. 1992).

"Standing Order System (SOS)"; Computrol, Inc.; DIALOG File751 (00239695); 1988.

Strategic Planning for Electronic Banking, Dimitris N. Chorafas, 1987, Butterworths & Co.

"Supermarket Branch Generates Loans," ABA Banking Journal, Update, p. 7, Sep. 1992.

"Teleprocessing package link all credit bureaus," ABA Banking Journal, New Products and Services, p. 83, Jul. 1982.

"Ten Technologies Ahead of the Curve," Institutional Investor, Dec. 1990, p. 123.

"The Back Office: Systems–Synovus at Crossroads After Decade of Growth," The American Banker, Management Strategies, p. 1A (Feb. 16, 1993).

"The Great Retail Delivery Debate", Roundtable, May 1994, p. 20, Susan Sandler, ed. New Paradigms In Retail Banking: The RDS report on the future of Retail Banking Delivery, BAI, 1994.

"The Instant Mortgage," Sichelman, Lew, United States Banker, Feb. 1988, National Edition.

"The Marriage of Mortgage Lending & Technology; Mortgage Banks' Use of Information Technologies," Mortgage Banking, vol. 53, No. 7, p. 65 (Apr. 1993).

"The Shape of Things to Come;" Special Section: Perspectives on the Future, Information Executive, vol. 4, No. 1, p. 37, (Jan. 1991).

"TSYS introduces a new credit card processing system–TS2," Business Wire, Sep. 14, 1992.

"University Support Services Announces State–of–the–Art Loan and Processing Service for Education Borrowers," PR Newswire, Jul. 15, 1993.

"Untangling Neural Nets (When Is One Model Better Than Another?)," Lawrence, J., Online Version, Apr. 1990.

Weekend Money (Cashpoints): Cash by Phone, The Guardian (London), Jan. 28, 1989.

"Credit decision cut down to 10 minutes", *Bank Advertising News*, p. 3, Nov. 13, 1989.

Office of Thrift Surpervision: Thrift Bulletin: Handbook: Compliance Activities: Subject: Equal Credit Opportunity Act: Federal Reserve Board Amends Regulation B; Dec. 29, 1989, Section 205; TB 40, pp. 1–15.

Bredin, Alice "Mervyn's test kiosks," National Retail Merchants Association 1993 Stores, vol. 75, No. 3, p. 36, ISSN: 0039–1867 (2 pages).

*MORNET® Your Secondary Mortgage Market Solution*, http://www.fanniemae.com/TechSrvc/MORNET/index.html, 2 pages, Copyright 1995–1996.

*Revolution In Progress: The Automated Loan Machine*, Affinity Financial Group, 10 pages, 1995.

"A man with grand visions," *Banking Technology*, pp. 30–32, May 1993.

Untitled Publication, from *Bank Systems & Technology*, 1 page, http://www.financetech.con/db_area/archives2/bst/1994/94070110.htm, Jul. 1994.

"Interactive Banking Gets a Push Up North," from *Bank Systems & Technology*, 2 pages, http://www.financetech.con/db_area/archives2/bst/1994/94030104.htm, Mar. 1994.

Radding, A., "A View of Technology in '92," *Bank Management*, vol. 68, No. 1, pp. 28–35, Jan. 1992, DIALOG File 15:ABI/INFORM, 10 pages.

Conroy, B., "Citicorp Test–Markets Device That Simplifies Home Banking," *The Business Journal–Phoenix & the Valley of the Sun*, vol. 10, No. 51, section 1, p. 16, Oct. 29, 1990, DIALOG File 635:Business Dateline, 2 pages.

"Loans in an Hour for Busy Shoppers," *American Banker*, vol. 154, No. 243, p. 6, Dec. 14, 1989, DIALOG File 625: American Banker Publications, 1 page.

Wilmsen, S., "Home–Banking Service Adding Denver to Financial Network," *Denver Post*, vol. 97, No. 309, section C, p. 1, Jun. 8, 1989, DIALOG File 635: Business Dateline, 2 pages.

"Malone introduces innovative banking services," *PR Newswire*, Jun. 8, 1989, DIALOG File 148:IAC Trade & Industry Database, 2 pages.

Read, R., "Crossing the track to success," *Euromoney*, p. 177(4), Jun. 1988, DIALOG File 75:IAC Management Contents, 8 pages.

Tyson, D.O., "Interlinq Mortgage Software Hits Big Time With Prudential Real Estate Subsidiary Deal," *American Banker*, pp. 12 and 15, Nov. 18, 1987.

*Welcome to Fannie Mae's Web Site*, http://www.fanniemae.com, 2 pages, printed Apr. 22, 1997, Copyright 1995–1996.

*FannieMae—Lender*, http://www.fanniemae.com/Lender/index.html, 2 pages, printed Apr. 22, 1997, Copyright 1995–1996.

Kantrow, Y.D., "Electronic Network Will Link Car Dealers to Many Lenders: Goal Is to Create a Form of EFT Transfer System," *American Banker*, vol. 153, No. 26, p. 1, Feb. 8, 1988, DIALOG File 625: American Banker Full Text, 3 pages.

Rothfeder, J., "Electronic Bill–Paying for the Little Guy," *Business Week*, No. 3125, p. 206E, Sep. 25, 1989.

*MortageWare Notice No. 90–005: Custom Report Generator—Choosing Loans*, Mar. 27, 1990.

Certified Translation of Japanese Laid–Open Patent Application No. H04–195256.

English Abstract of Japanese Patent Publication No. H04–195256, 1 page, data provided by ep.espacenet.com.

Computerized English Translation of Japanese Patent Publication No. 05–101250, 5 pages, translation automatically provided by the Japanese Patent Office at www4.ipdl.inpit.go.jp.

English Abstract of Japanese Patent Publication No. 05–101250, 1 page, data provided by ep.espacenet.com.

Computerized English Translation of Japanese Patent Publication No. 06–243157, 6 pages, translation automatically provided by the Japanese Patent Office at www4.ipdl.inpit.go.jp.

English Abstract of Japanese Patent Publication No. 06–243157, 1 page, data provided by ep.espacenet.com.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4–6, 10 and 11 are confirmed.

Claim 12 is determined to be patentable as amended.

Claims 14–16 and 19, dependent on an amended claim, are determined to be patentable.

Claims 3, 7–9, 13, 17, 18 and 20 were not reexamined.

12. A method according to claim 11, further comprising the steps of:

generating, via said first data processing device which is responsive to the inputted necessary information concerning the loan applicant, each necessary application form required by the lending institution in a format authorized by and acceptable to the lending institution;

only allowing, when [is] *in* said review mode of operation, said loan applicant to read certain information concerning said loan application of said loan applicant but not authorizing said loan applicant to make any corrections to said loan application of said loan applicant but only respond to information requested by said lending institution; and supply desired warnings messages and notices to said loan applicant after submission of said loan application to said lending institution but prior to a final determination of the loan, relating to possible problems determined by said lending institution and changes made by said lending institution in the loan process.

\* \* \* \* \*